(12) United States Patent
Zhao et al.

(10) Patent No.: US 12,044,597 B1
(45) Date of Patent: Jul. 23, 2024

(54) DEVICE FOR MEASURING WALL SURFACE COOLING CHARACTERISTIC OF GAS TURBINE COMBUSTOR AND MODELING METHOD THEREOF

(71) Applicant: HARBIN ENGINEERING UNIVERSITY, Harbin (CN)

(72) Inventors: Ningbo Zhao, Harbin (CN); Shaowen Luo, Harbin (CN); Jihao Sun, Harbin (CN); Hongtao Zheng, Harbin (CN); Honglei Yang, Harbin (CN); Ren Yang, Harbin (CN); Shilin Yan, Harbin (CN); Fuquan Deng, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/407,474

(22) Filed: Jan. 9, 2024

(30) Foreign Application Priority Data

Jan. 10, 2023 (CN) .......................... 202310035394.3

(51) Int. Cl.
*G01M 15/14* (2006.01)
*G01M 15/02* (2006.01)

(52) U.S. Cl.
CPC ............ *G01M 15/14* (2013.01); *G01M 15/02* (2013.01)

(58) Field of Classification Search
None
See application file for complete search history.

(56) References Cited

U.S. PATENT DOCUMENTS 6,543,993 B2 * 4/2003 Burdgick ................ F01D 25/12
415/114
7,966,868 B1 * 6/2011 Sonnichsen ......... G01M 99/002
73/118.03

FOREIGN PATENT DOCUMENTS

CN 110530923 A 12/2019

* cited by examiner

*Primary Examiner* — Erica S Lin
(74) *Attorney, Agent, or Firm* — Bayramoglu Law Offices LLC

(57) ABSTRACT

A device for measuring a wall surface cooling characteristic of a gas turbine combustor and a modeling method thereof are provided. The device includes a hot flow inlet section, a cold flow inlet section, and a gas discharge section, where the cold flow inlet section is communicated with an experimental section; the cooling structure model is a flat plate structure; a tail end of the experimental section is provided with a thermocouple threading seat; the gas discharge section is provided with a laser injection window; and the experimental section is provided with an infrared thermal imaging measurement window and a visual observation window. The modeling method includes: modeling the wall surface of the gas turbine combustor into the flat plate structure; determining a pressure, a temperature, and a velocity on a hot flow side of the device; and determining a material and a thickness of the cooling structure model.

7 Claims, 6 Drawing Sheets

DEVICE FOR MEASURING WALL SURFACE COOLING CHARACTERISTIC OF GAS TURBINE COMBUSTOR AND MODELING METHOD THEREOF

CROSS-REFERENCE TO THE RELATED APPLICATIONS

This application is based upon and claims priority to Chinese Patent Application No. 202310035394.3, filed on Jan. 10, 2023, the entire contents of which are incorporated herein by reference.

TECHNICAL FIELD

The present disclosure relates to a technique for measuring a wall surface cooling characteristic of a gas turbine combustor.

BACKGROUND

With the development of gas turbine combustors towards high temperatures, the temperature resistance of combustor flame tubes is being severely tested. Developing advanced and efficient cooling technologies on the basis of improving the temperature resistance of high-temperature alloy materials and researching new thermal coating materials has gradually attracted widespread attention from researchers.

In order to deeply explore the cooling mechanism of the cooling structure and evaluate the cooling effect, researchers have conducted extensive research on the flow and cooling characteristics of the flame tube cooling structure through experimental and numerical simulation methods, etc. However, conducting full-scale model experiments of combustors faces challenges such as high costs, limited use of measurement tools, and complex result analysis. Therefore, designing a small-sized model to measure the cooling characteristic of the cooling structure and ensuring consistency between the operating condition of the small-sized model and that of the actual combustor has become a research focus.

SUMMARY

In order to solve or at least alleviate at least one of the above-mentioned problems, the present disclosure provides a device for measuring a wall surface cooling characteristic of a gas turbine combustor and a modeling method thereof.

An aspect of the present disclosure provides a device for measuring a wall surface cooling characteristic of a gas turbine combustor, including a hot flow inlet section, a cold flow inlet section, an experimental section, and a gas discharge section, where the hot flow inlet section, the cold flow inlet section, and the gas discharge section are sequentially communicated; and the cold flow inlet section and the experimental section are communicated through cooling holes of a cooling structure model;

the cooling structure model is a flat plate structure for simulating a wall surface of a gas turbine combustor; the flat plate structure is provided with the cooling holes and guide rings; the cooling holes on the flat plate structure have same aperture, spacing, and holes-area ratio as cooling holes on the wall surface of the gas turbine combustor; and the guide rings of the flat plate structure have same spacing as guide rings on the wall surface of the gas turbine combustor;

a gas fuel enters the hot flow inlet section and enters the experimental section through the hot flow inlet section; cold air enters the cold flow inlet section and enters the experimental section through the cooling structure model; and a gas in the experimental section enters the gas discharge section and is discharged to an outside of the device through the gas discharge section; and a tail end of the experimental section is provided with a thermocouple threading seat; the gas discharge section is provided with a laser injection window; and the experimental section is provided with an infrared thermal imaging measurement window and a visual observation window.

Optionally, in the device for measuring a wall surface cooling characteristic of a gas turbine combustor according to the present disclosure, a hot flow rectification orifice plate is provided between the hot flow inlet section and the experimental section.

Optionally, in the device for measuring a wall surface cooling characteristic of a gas turbine combustor according to the present disclosure, the cold flow inlet section includes a cold flow collection chamber and a cold flow chamber; a cold flow rectification orifice plate is provided between the cold flow collection chamber and the cold flow chamber; the cooling structure model is provided between the cold flow collection chamber and the experimental section; and the cold air passes through the cold flow collection chamber and the cold flow chamber in sequence before entering the experimental section.

Optionally, in the device for measuring a wall surface cooling characteristic of a gas turbine combustor according to the present disclosure, the gas discharge section includes a gas inlet direction the same as a flow direction of the gas fuel in the experimental section and a gas outlet direction opposite to the gas inlet direction.

Optionally, in the device for measuring a wall surface cooling characteristic of a gas turbine combustor according to the present disclosure, the experimental section is externally covered with a heat insulation layer.

Optionally, in the device for measuring a wall surface cooling characteristic of a gas turbine combustor according to the present disclosure, the hot flow inlet section, the cold flow inlet section, and the gas discharge section are integrated.

Another aspect of the present disclosure further provides a modeling method of the device for measuring a wall surface cooling characteristic of a gas turbine combustor, including:

modeling the wall surface of the gas turbine combustor into the flat plate structure, where the flat plate structure serves as the cooling structure model of the device; the flat plate structure is provided with the cooling holes and guide rings; the cooling holes on the flat plate structure have same aperture, spacing, and holes-area ratio as the cooling holes on the wall surface of the gas turbine combustor; and the guide rings of the flat plate structure have same spacing as the guide rings on the wall surface of the gas turbine combustor;

determining a pressure, a temperature, and a velocity on a hot flow side of the device based on a Reynolds number on a hot flow side of the gas turbine combustor under an actual operating condition; and determining a material and a thickness of the cooling structure model based on a Biot number on the hot flow side of the gas turbine combustor under the actual operating condition.

Optionally, in the modeling method of a device for measuring a wall surface cooling characteristic of a gas turbine combustor according to the present disclosure, the determining a pressure, a temperature, and a velocity on a hot flow side of the device based on a Reynolds number on a hot flow side of the gas turbine combustor under an actual operating condition includes:

calculating the Reynolds number on the hot flow side under the actual operating condition;

supposing that the Reynolds number on the hot flow side under the actual operating condition is the same as the Reynolds number on the hot flow side of the device; and determining the pressure, the temperature, and the velocity on the hot flow side of the device based on the Reynolds number on the hot flow side of the device.

Optionally, in the modeling method of a device for measuring a wall surface cooling characteristic of a gas turbine combustor according to the present disclosure, the determining a material and a thickness of the cooling structure model based on a Biot number on the hot flow side of the gas turbine combustor under the actual operating condition includes:

calculating the Biot number Bi of the gas turbine combustor according to $$Bi = \frac{ht_w}{\lambda},$$

where h denotes a coupled heat transfer coefficient of convective heat transfer and thermal radiation of the wall surface of the gas turbine combustor; $t_w$ denotes a thickness of the wall surface of the gas turbine combustor, and $\lambda$ denotes a thermal conductivity coefficient of the wall surface of the gas turbine combustor;

supposing that a Biot number on the hot flow side of the device is the same as the Biot number on the hot flow side of the gas turbine combustor under the actual operating condition; and determining the material and the thickness of the cooling structure model based on the Biot number on the hot flow side of the device.

Optionally, the modeling method of the device for measuring a wall surface cooling characteristic of a gas turbine combustor according to the present disclosure further includes:

verifying a modeling result based on a dimensionless comprehensive cooling efficiency.

The device for measuring wall surface cooling characteristic of gas turbine combustor and the modeling method thereof according to the present disclosure can achieve at least one of the following beneficial effects.

Compared to the wall surface cooling characteristic experiment of the actual combustor, the modeling method and measuring device of the present disclosure improve the experimental accuracy, acquire real experimental results, and significantly reduce the measurement complexity and construction difficulty.

The cold flow inlet section and hot flow inlet section of the measuring device are each provided with a flow collection chamber and a replaceable rectification orifice plate, which can change the inlet turbulence while rectifying. The present disclosure can model the actual operating condition of the gas turbine combustor by adjusting parameters such as temperature, flow rate, and turbulence of hot and cold air, thereby reducing experimental costs.

The upper wall surface of the experimental section of the measuring device is provided with the experimental section cover plate, which facilitates the disassembly and assembly of the cooling structure model and the arrangement of thermocouple.

The measuring device is provided with the laser injection window, the infrared thermal imaging measurement window, and the visual observation window, through which the measuring device can simultaneously measure the cooling and flow characteristics of the cooling structure model, reducing measurement time.

BRIEF DESCRIPTION OF THE DRAWINGS

In order to achieve the above and related objectives, certain illustrative aspects of the present disclosure are described below according to the drawings, and these illustrative aspects indicate various ways in which the principles of the present disclosure can be practiced. All the aspects and their equivalents should fall within the protection scope of the present disclosure. The above and other objectives, features, and advantages of the present disclosure will become more apparent according to the drawings and the detailed description below. Throughout the present disclosure, the same reference numerals typically refer to the same components or elements.

FIG. 5A shows the streamline distribution under the actual operating condition; and FIG. 5B shows the streamline distribution under the modeled operating condition.

DETAILED DESCRIPTION OF THE EMBODIMENTS

Exemplary embodiments of the disclosure will be described below in more detail with reference to the drawings. Although the drawings show exemplary embodiments of the disclosure, it should be understood that the disclosure may be implemented in various forms and should not be limited to the embodiments set forth herein. On the contrary, these embodiments are provided so that the disclosure will be more fully understandable, and will fully convey the scope of the disclosure to those skilled in the art.

Figure 1:
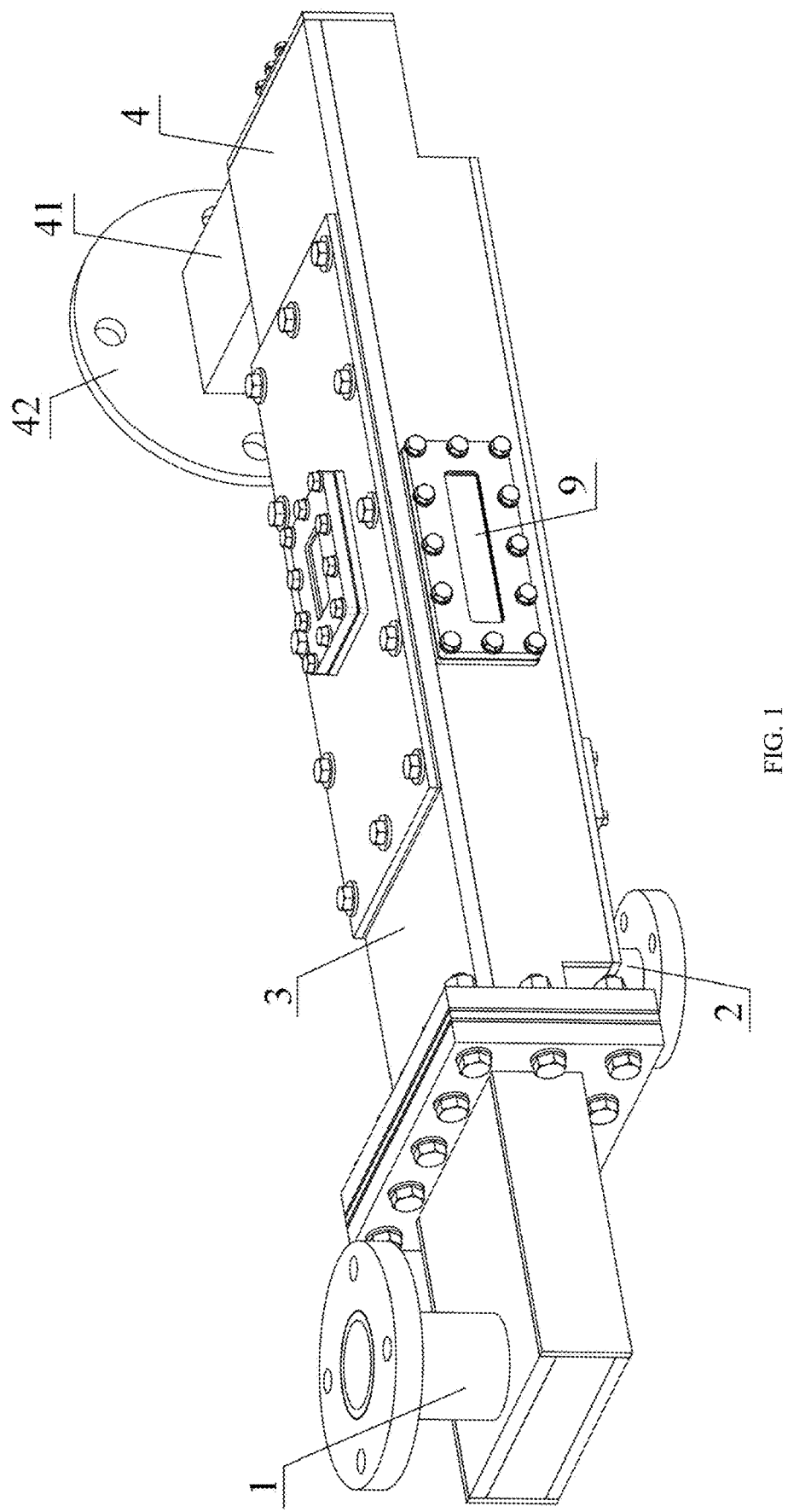
FIG. 1 is a structural diagram of a device for measuring a wall surface cooling characteristic of a gas turbine combustor according to an embodiment of the present disclosure.
Figure 2:
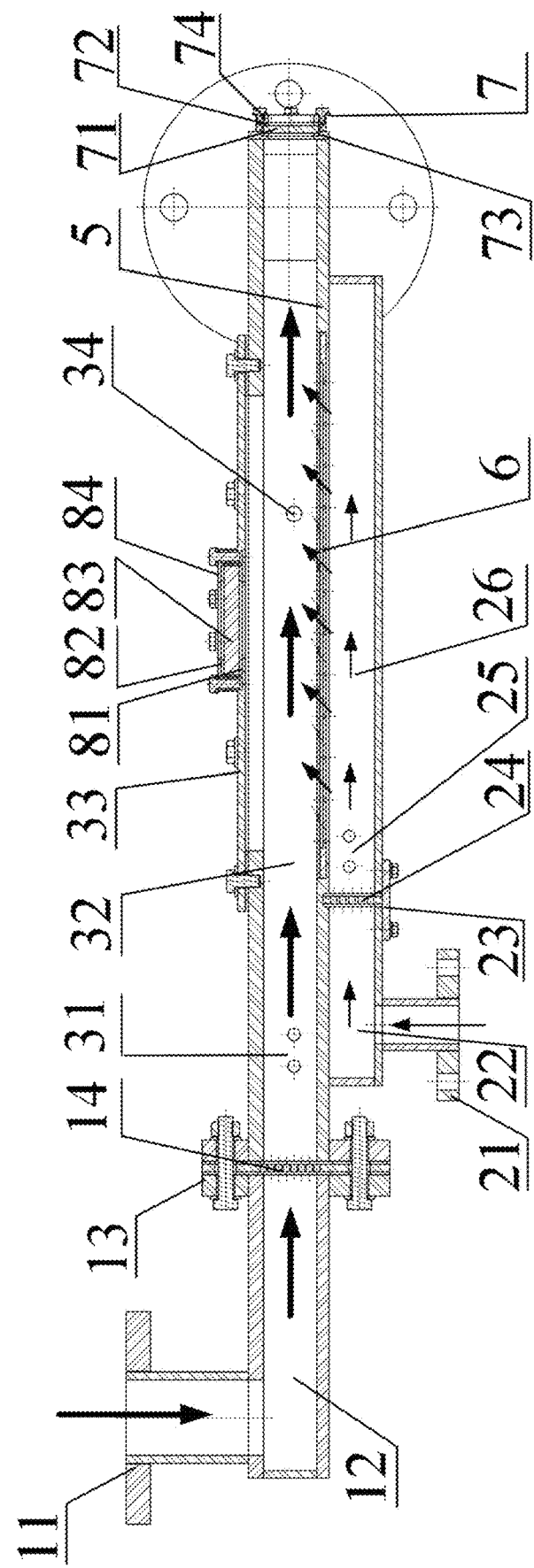
FIG. 2 is an internal view of the device shown in FIG. 1.

FIG. 1 is a structural diagram of a device (hereinafter referred to as measuring device) for measuring a wall surface cooling characteristic of a gas turbine combustor according to an embodiment of the present disclosure, and FIG. 2 is an internal view of the measuring device shown in FIG. 1. As shown in FIGS. 1 and 2, the measuring device is configured to simulate the gas turbine combustor, and includes hot flow inlet section 1, cold flow inlet section 2, experimental section 3, and gas discharge section 4. The hot flow inlet section 1, the cold flow inlet section 2, and the gas discharge section 4 are sequentially communicated. The cold flow inlet section 2 is adjacent to the experimental section 3, and cooling structure model 6 is provided between the cold flow inlet section and the experimental section. The cooling structure model 6 is configured to simulate a wall surface of the gas turbine combustor. The cooling structure model 6 adopts a flat plate structure. The cooling structure model 6 is provided with cooling holes 61 and guide rings. The aperture, spacing, and holes-area ratio of the cooling holes are the same as the aperture (1-10 mm), spacing, and holes-area ratio of the cooling holes on the wall surface of the gas turbine combustor. The spacing between the guide rings on the cooling structure model 6 is the same as the spacing between guide rings on the wall surface of the gas turbine combustor. The cooling structure model 6 has a thickness of 5-10 mm. The cooling structure model 6 is further provided with fixing holes for fixing the cooling structure model 6. The cooling structure model 6 can be a single-layer plate (such as an experimental plate with a sweat cooling structure and an impingement-film cooling structure experimental plate with guide rings), or a multi-layer plate (such as an experimental plate with an impact-transpiration cooling structure).

As shown in FIG. 2, the hot flow inlet section 1 is located in front of the experimental section 3, and includes hot flow inlet flange 11, hot flow collection chamber 12, connecting flange 13, and hot flow rectification orifice plate 14. The hot flow inlet flange 11 is located on an upper wall surface of a front end of the hot flow collection chamber 12. The connecting flange 13 is located at a tail end of the hot flow collection chamber 12 and is configured to connect the hot flow collection chamber 12 and the experimental section 3. The hot flow rectification orifice plate 14 is fixed in a middle position of the connecting flange 13, and a sealing gasket is fixed between the hot flow rectification orifice plate 14 and the connecting flange 13. The hot flow inlet flange 11 serves as an inlet of the hot flow inlet section 1, and the hot flow rectification orifice plate 14 serves as an outlet of the hot flow inlet section 1.

The cold flow inlet section 2 is divided into cold flow collection chamber 22 and cold flow chamber 26 by the cold flow rectification orifice plate 24. The cold flow rectification orifice plate 24 is fixed to cold flow rectification orifice plate mounting seat 23 by a bolt and a sealing gasket. The cold flow collection chamber 22 includes an inlet serving as cold flow inlet flange 21 and an outlet serving as the cold flow rectification orifice plate 24. The cold flow chamber 26 includes an inlet serving as the cold flow rectification orifice plate 24 and an outlet serving as the cooling structure model 6. Cold flow inlet measurement mounting seat 25 includes two holes and is located at a side of the cold flow chamber 26. The cold flow inlet section 2 is configured to rectify cold air and measure a temperature and pressure of the cold air. The cold flow chamber has a width of 150-180 mm.

The cooling structure model 6 includes one side provided with the cold flow chamber 26 and the other side provided with the experimental section 3. The cooling structure model 6 is fixed to cooling structure model fixing seat 5 by a bolt.

The experimental section 3 includes hot flow inlet measurement mounting seat 31, hot flow chamber 32, experimental section cover plate 33, and thermocouple threading seat 34. The experimental section cover plate 33 is located on an upper wall surface of the hot flow chamber 32. The experimental section cover plate 33 is detachable, which facilitates the replacement of the cooling structure model 6 and the arrangement of a thermocouple. The experimental section 3 has a width of 150-180 mm and a height of 25-35 mm. An outer side of the experimental section 3 is insulated with insulation materials such as fiberglass board and asbestos. The hot flow inlet measurement mounting seat 31 is provided at a side wall surface of the hot flow chamber 32. The hot flow inlet measurement mounting seat 31 includes two holes and is configured to mount a measurement probe for measuring a temperature and pressure of hot air. During an experiment, the thermocouple is provided on the cooling structure model 6 through the thermocouple threading seat 34 located at a tail end of the hot flow chamber 32 to measure a temperature of a hot flow side wall surface of the cooling structure model 6. The experimental section 3 is further provided with infrared thermal imaging measurement window 8 and visual observation window 9. The infrared thermal imaging measurement window 8 is located on the experimental section cover plate 33. The infrared thermal imaging measurement window 8 is configured to measure the temperature of the entire hot flow side wall surface of the cooling structure model 6. The visual observation window 9 is located at a side wall surface of the experimental section 3 and configured to measure an air flow characteristic of a near wall surface of the cooling structure model 6. The visual observation window and cold/hot flow inlet measurement mounting holes are not on the same side wall surface.

The infrared thermal imaging measurement window 8 includes infrared thermal imaging measurement glass 81 (preferably quartz glass), sealing gasket 82, infrared thermal imaging measurement glass mounting seat 83, and infrared thermal imaging measurement glass cover plate 84. The infrared thermal imaging measurement glass mounting seat 83 and the experimental section cover plate 33 can be integrated. The infrared thermal imaging measurement glass 81 is provided inside the infrared thermal imaging measurement glass mounting seat 83. The infrared thermal imaging measurement glass cover plate 84 is located outside the infrared thermal imaging measurement glass 81 and configured to fix and protect the infrared thermal imaging measurement glass 81. The infrared thermal imaging measurement glass 81 is fixed to the infrared thermal imaging measurement glass mounting seat 83 by a bolt. The sealing gasket 82 is provided between the infrared thermal imaging measurement glass 81 and the infrared thermal imaging measurement glass mounting seat 83, as well as between the infrared thermal imaging measurement glass 81 and the infrared thermal imaging measurement glass cover plate 84.

Figure 3:
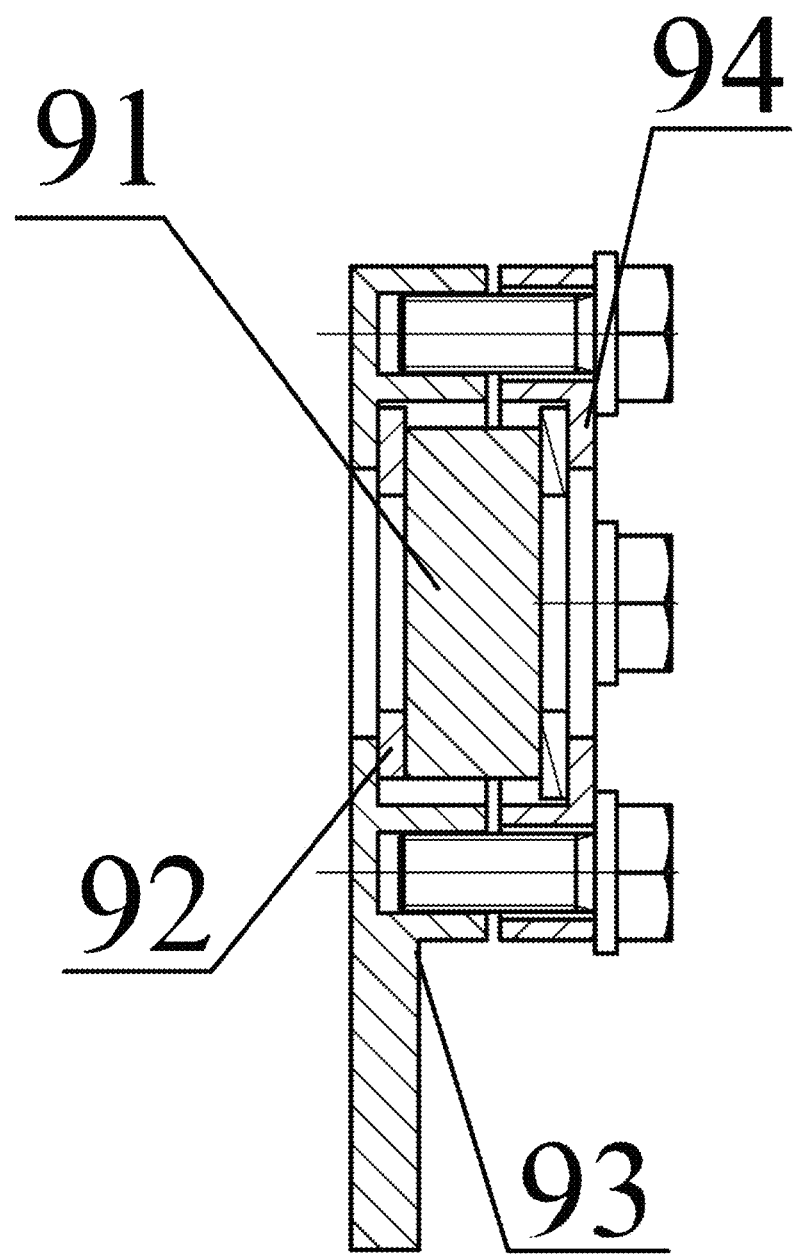
FIG. 3 is a structural diagram of visual observation window 9 according to an embodiment of the present disclosure.

As shown in FIG. 3, the visual observation window 9 includes visual observation glass 91 (preferably quartz glass), sealing gasket 92, visual observation glass mounting seat 93, and visual observation glass cover plate 94. The visual observation glass mounting seat 93 includes a lower end flush with a lower end of the cooling structure model fixing seat 5 and an upper end flush with an upper end of the side wall surface of the experimental section 3. The visual observation glass 91 is provided inside the visual observation glass mounting seat 93, and the visual observation glass cover plate 94 is located outside the visual observation glass 91. The visual observation glass cover plate 94 is provided on the visual observation glass mounting seat 93 by a bolt. The sealing gasket 92 is provided between the visual observation glass 91 and the visual observation glass mounting seat 93, as well as between the visual observation glass 91 and the visual observation glass cover plate 94.

The gas discharge section 4 includes discharge transition section 41 and discharge outlet flange 42. The gas discharge section 4 is located behind the experimental section 3 and integrated with the experimental section 3. The discharge transition section 41 includes one end communicated with the experimental section 3 and the other end communicated with the discharge outlet flange 42. A gas inlet direction of the discharge turning section 41 is perpendicular to a gas outlet direction thereof, and laser injection window 7 is provided on a wall surface of the discharge turning section 41 opposite to the experimental section 3. Laser is incident on the experimental section 3 through the laser injection window 7 to measure a flow field.

The laser injection window 7 includes laser injection glass 71 (preferably quartz glass), sealing gasket 72, laser injection glass mounting seat 73, and laser injection glass cover plate 74. The laser injection glass mounting seat 73 can be integrated with the gas discharge section 4. A center position of the laser injection glass mounting seat 73 is coaxial with the hot flow chamber 32. The laser injection glass 71 is provided inside the laser injection glass mounting seat 73. The laser injection glass cover plate 74 is located outside the laser injection glass 71 and configured to fix and protect the laser injection glass 71. The laser injection glass cover plate 74 is provided on the laser injection glass mounting seat 73 by a bolt. To ensure the airtightness of the laser injection window 7 and avoid damage to the laser injection glass 71, the sealing gasket 72 is provided between the laser injection glass 71 and the laser injection glass mounting seat 73, as well as between the laser injection glass 71 and the laser injection glass cover plate 74.

In the measuring device, the hot air enters the hot flow collection chamber 12 through the hot flow inlet flange 11, and is rectified by the hot flow rectification orifice plate 14 before entering the hot flow chamber 32. The cold air with tracer ions enters the cold flow collection chamber 22 through the cold flow inlet flange 21 and enters the cold flow chamber 26 through the cold flow rectification orifice plate 23. The cold air enters the hot flow chamber 32 through the cooling holes 61 of the cooling structure model 6 and mixes with the hot air. The mixed air enters the discharge transition section 41 of the gas discharge section 4 and is discharged from the discharge outlet flange 42. A probe for measuring a cold air pressure and a probe for measuring a cold air temperature are fixed to the cold flow inlet measurement mounting seat 25, and a probe for measuring a hot air pressure and a probe for measuring a temperature are fixed to the hot flow inlet measurement mounting seat 31. The probes lead out the gas inside the cold flow chamber 26 and the hot flow chamber 32 for measurement. The laser is incident from the laser injection window 7 into the hot flow chamber 32 and acts on the tracer ions inside the hot flow chamber 32 to measure the flow characteristic of the gas inside the hot flow chamber 32. An infrared thermal imager is used to measure the temperature of each point on the hot flow side wall surface (i.e. upper wall surface) of the cooling structure model 6 through the infrared thermal imaging measurement window 8. The measurement data can be observed through the visual observation window 9.

The measuring device can simulate the structure of an actual gas turbine combustor. In order to accurately measure the wall surface cooling characteristic of the gas turbine combustor, it is necessary to model the measuring device to achieve the following objectives. (1) The structural characteristic of the cooling structure model 6 is the same as the wall surface structural characteristic of the actual gas turbine combustor. (2) The cooling structure model 6 of the measuring device is located in an environment that is as close as possible to the actual operating condition of the gas turbine combustor. Specifically, the flow and heat transfer of the hot gas inside the measuring device, as well as the dimensionless comprehensive cooling efficiency, are the same as those of the actual gas turbine combustor.

Figure 4:
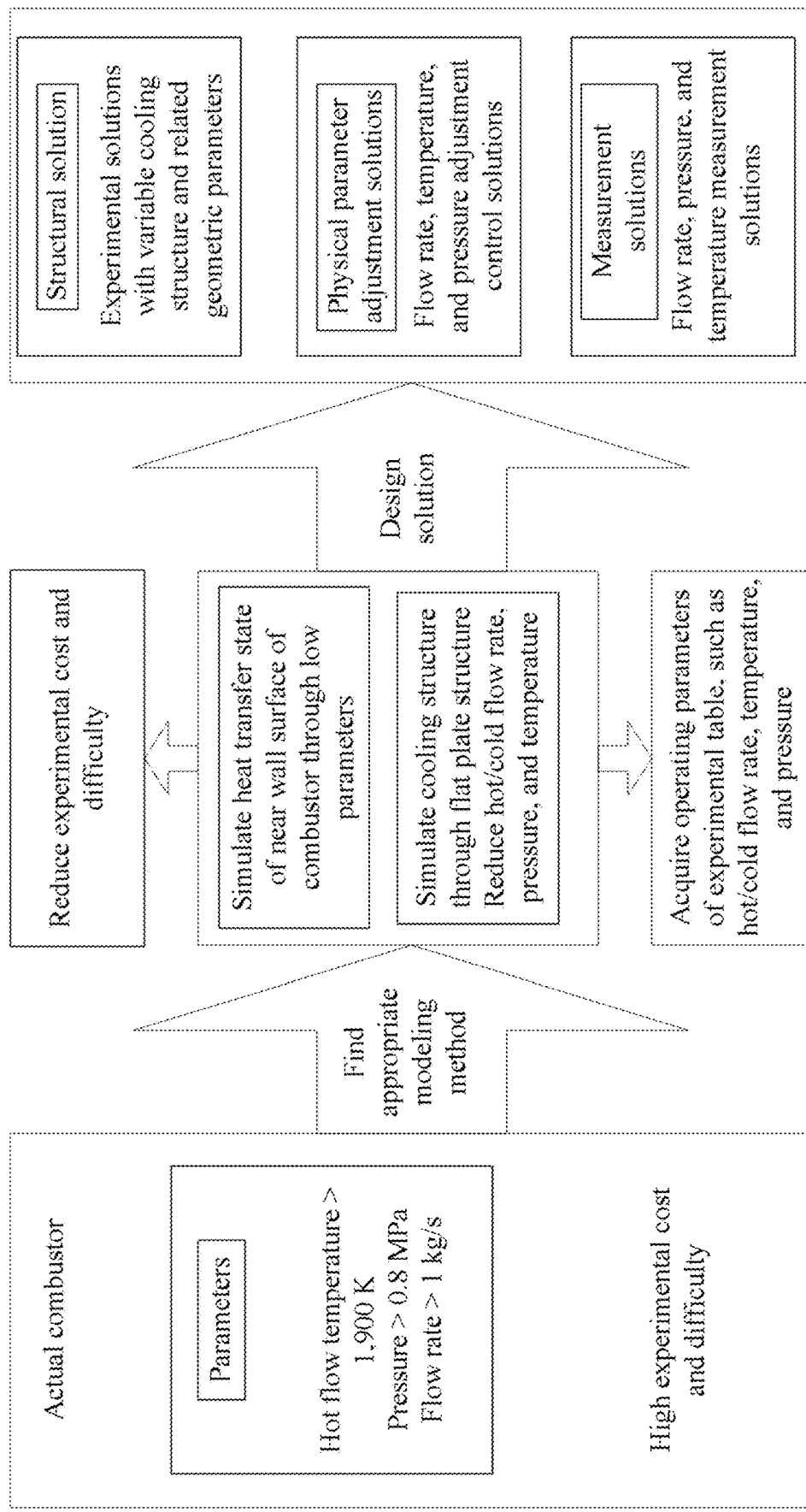
FIG. 4 is a design idea diagram of a modeling method of the device for measuring a wall surface cooling characteristic of a gas turbine combustor according to an embodiment of the present disclosure.

For this purpose, an embodiment of the present disclosure further provides a modeling method of the measuring device. As shown in FIG. 4, in the actual combustor, the hot air is in a high-temperature and high-pressure state. If a device of the same size as the gas turbine combustor is used for a measurement experiment, it has the problem of high experimental cost and difficulty. Therefore, an appropriate modeling method is needed to reduce the experimental costs and difficulty. The goal of modeling is to simulate the heat transfer state of the near wall surface of the gas turbine combustor through low parameters (such as low temperature, low pressure, and low flow rate) and to simulate the actual wall surface of the gas turbine combustor through a simple structure (such as a flat plate structure). After the modeling method is determined, the operating parameters of the measuring device (including the flow rate, temperature, and pressure of the cold air and the hot air) need to be further determined. Based on the above idea, it is necessary to determine: (1) a structural solution of the measuring device, including experimental solutions with variable cooling structure and related geometric parameters; (2) physical parameter adjustment solutions, including flow rate, temperature, and pressure adjustment control solutions; and (3) measurement solutions, including flow rate, pressure, and temperature measurement solutions.

For the structural solution of the measuring device, a flat plate structure is used as the cooling structure to replace the curved structure of the actual combustor.

For the physical parameter adjustment solutions, a conventional method can be used to regulate the gas flow rate, temperature, and pressure.

For the measurement solutions, the thermocouple provided on the flat plate structure or the infrared thermal imager can be used to measure the temperature of the flat plate structure, and a conventional method can be used to measure the flow rate and pressure.

In the embodiment of the present disclosure, firstly, the modeling method acquires an experimental cooling structure through a cooling structure similarity modeling process. Then, the modeling method acquires cooling structure related parameters and modeling parameters for the experiment through flow and heat transfer similarity modeling, and verifies modeling results according to the dimensionless comprehensive cooling efficiency. Finally, the modeling method applies the acquired results to an actual wall cooling design.

The modeling method specifically includes steps 1 to 4.

Step 1. The wall surface of the gas turbine combustor is modeled into a flat plate structure. The flat plate structure serves as the cooling structure model of the measuring device, and replaces the curved wall structure of the gas turbine combustor.

A structural characteristic of the flat plate structure is determined. In order to maximize the consistency between the structural characteristic of the flat plate structure and the wall surface structural characteristic of the actual gas turbine combustor, the flat plate structure is provided with the cooling holes and guide rings. The aperture, spacing, and holes-area ratio of the cooling holes on the flat plate structure are the same as those of the cooling holes on the wall surface of the gas turbine combustor. In addition, the spacing between the guide rings of the flat plate structure is the same as the spacing between the guide rings on the wall surface of the gas turbine combustor.

Step 2. The pressure, temperature, and velocity of the hot flow side of the measuring device are determined based on a Reynolds number on the hot flow side of the gas turbine combustor under an actual operating condition. This step is to achieve flow similarity modeling, that is, to ensure that the flow characteristic on the hot flow side of the measuring device is the same as the flow characteristic on the hot flow side of the gas turbine combustor under the actual operating condition.

The Reynolds number $Re_{gas}$ on the hot flow side under the actual operating condition is calculated as follows:

$$Re_{gas} = \frac{\rho_{gas} u_{gas} d_{gas}}{\eta_{gas}}$$

where, $\rho_{gas}$ denotes a gas density on the hot flow side; $u_{gas}$ denotes a velocity on the hot flow side; $d_{gas}$ denotes a characteristic length; and $\eta_{gas}$ denotes a dynamic viscosity coefficient of the gas on the hot flow side. $\rho_{gas}$ and $\eta_{gas}$ are calculated based on the temperature and pressure on the hot flow side, which can be measured. $u_{gas}$ and $d_{gas}$ are measured data.

It is supposed that the Reynolds number on the hot flow side under the actual operating condition is the same as the Reynolds number on the hot flow side of the measuring device. The Reynolds number on the hot flow side of the measuring device also conforms to the above equation. The pressure, temperature, and velocity on the hot flow side of the measuring device are determined based on the Reynolds number on the hot flow side of the measuring device. For the measuring device, a too small characteristic length can make data measurement inconvenient. Due to the overall size of the measuring device, the characteristic length cannot be too large. Therefore, the characteristic length needs to be within a reasonable range. The velocity on the hot flow side also needs to be within a preset range and should not be too high or too low. Under the actual operating condition, the hot flow side is in a high-temperature and high-pressure state, but in order to reduce the experimental difficulty, the hot flow side of the measuring device can be in a low-temperature and low-pressure state. After the characteristic length and the velocity, temperature, and pressure range on the hot flow side of the measuring device are determined, a set of reasonable values are determined based on the above equation, including the gas density and velocity on the hot flow side, the characteristic length, and the dynamic viscosity coefficient of the gas on the hot flow side, such that the Reynolds number on the hot flow side under the actual operating condition is the same as the Reynolds number on the hot flow side of the measuring device.

Step 3. A material and thickness of the cooling structure model are determined based on a Biot number on the hot flow side of the gas turbine combustor under the actual operating condition. This step is to achieve heat transfer similarity modeling, that is, to ensure that the Biot number on the hot flow side of the measuring device is the same as the Biot number on the hot flow side of the gas turbine combustor under the actual operating condition.

The Biot number Bi on the hot flow side is calculated as follows:

$$Bi = \frac{h t_w}{\lambda}$$

where, $\lambda$ denotes a thermal conductivity coefficient of the cooling structure; $t_w$ denotes the thickness of the cooling structure; and h denotes a coupled heat transfer coefficient of convective heat transfer and thermal radiation of the cooling structure.

For the gas turbine combustor, $\lambda$ denotes a thermal conductivity coefficient of a wall surface material of the gas turbine combustor, $t_w$ denotes a thickness of the wall surface material of the gas turbine combustor, and h denotes a coupled heat transfer coefficient of convective heat transfer and thermal radiation of the wall surface of the gas turbine combustor. For the measuring device, $\lambda$ denotes the thermal conductivity coefficient of the material of the cooling structure model, $t_w$ denotes the thickness of the material of the cooling structure model, and h denotes the coupled heat transfer coefficient of convective heat transfer and thermal radiation of the cooling structure model.

According to the above equation, the Biot number Bi on the hot flow side of the actual combustor is calculated. An appropriate material and an appropriate thickness are chosen such that the Biot number on the hot flow side of the measuring device is equal to that on the hot flow side of the gas turbine combustor under the actual operating condition.

For example, for the wall surface of the flame tube in the actual combustor, the coupled heat transfer coefficient h of convective heat transfer and thermal radiation is about 700 W/(m²·K), the thermal conductivity coefficient $\lambda$ of the wall surface material of the flame tube is about 33 W/(m·K), and the thickness $t_w$ of the flame tube is 2 mm. Therefore, the Biot number on the hot flow side of the wall surface of the actual combustor flame tube is:

$$Bi = \frac{h t_w}{\lambda} \approx 0.0424$$

For the measuring device, considering the influences of thermal conductivity coefficient of the material and the wall thickness of the cooling structure model, a stainless steel cooling structure model is selected, with a thermal conductivity coefficient of about 22 W/(m·K). In the experiment, the mainstream hot air is heated by atmospheric electric heating (with relatively small and negligible thermal radiation), and the surface heat transfer coefficient of the hot side wall is about 120 W/(m²·K). To ensure that the Biot number on the hot flow side of the cooling structure model of the measuring device is similar to the Biot number on the hot flow side of the actual combustor flame tube wall, the thickness of the cooling structure model can be 8 mm. At this point, the Biot number on the hot flow side of the cooling structure model of the measuring device is:

$$Bi = \frac{h t_w}{\lambda} \approx 0.0436$$

Step 4. A modeling result is verified based on a dimensionless comprehensive cooling efficiency.

The dimensionless comprehensive cooling efficiency $\phi$ is defined by hot air temperature $T_{gas}$, cold air temperature $T_{cool}$, and the temperature $T_{wall}$ on the hot flow side of the cooling structure model:

$$\phi = \frac{T_{gas} - T_{wall}}{T_{gas} - T_{cool}}$$

The dimensionless comprehensive cooling efficiency can be calculated based on $T_{gas}$, $T_{cool}$, and $T_{wall}$ under the actual and modeled operating condition. If the consistency between the dimensionless comprehensive cooling efficiency under the actual operating condition and that under the simulated operating condition is acceptable, it is considered that the simulated operating condition can be used to simulate the actual operating condition.

The actual combustor and the measuring device acquired by the modeling method are simulated. Streamline distributions under the actual and modeled operating conditions are acquired, as shown in FIGS. 5A and 5B, and distributions of the dimensionless comprehensive cooling efficiency under the actual and modeled conditions are acquired, as shown in FIG. 6.

Figure 5B:
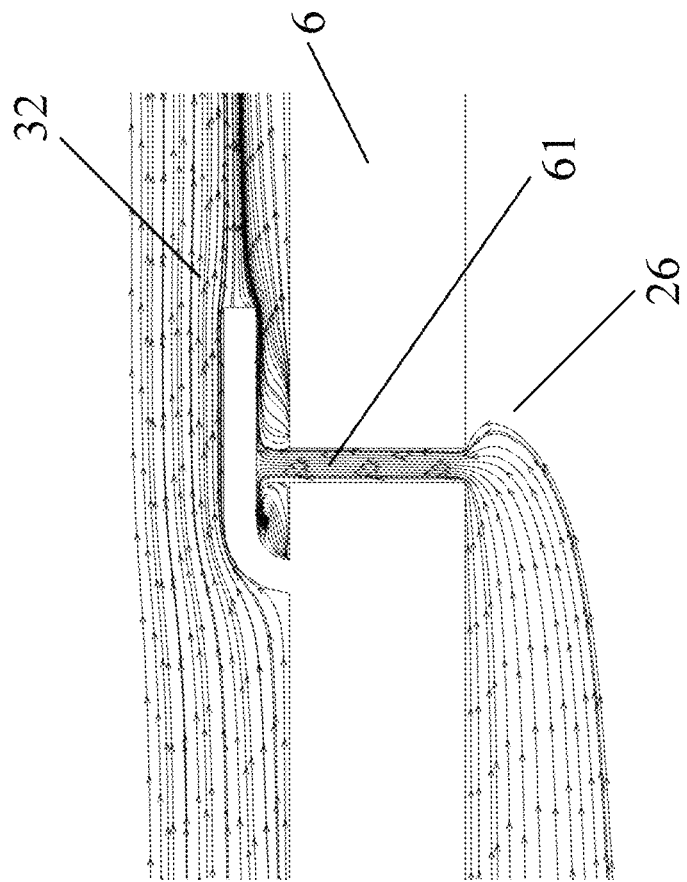
FIGS. 5A and 5B show streamline distributions under actual and modeled operating conditions, where
Figure 5A:
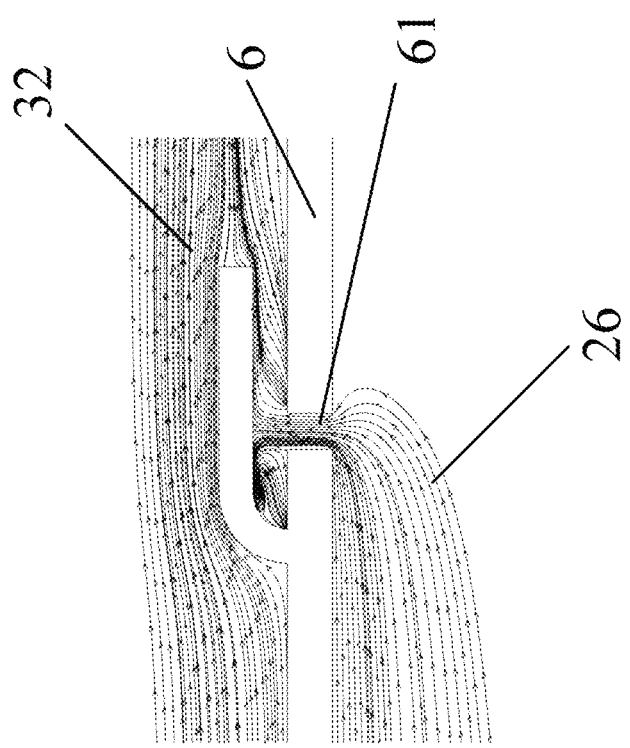

According to FIGS. 5A and 5B, the measuring device acquired by the modeling method well reproduces the streamline distribution under the actual operating condition.

Figure 6:
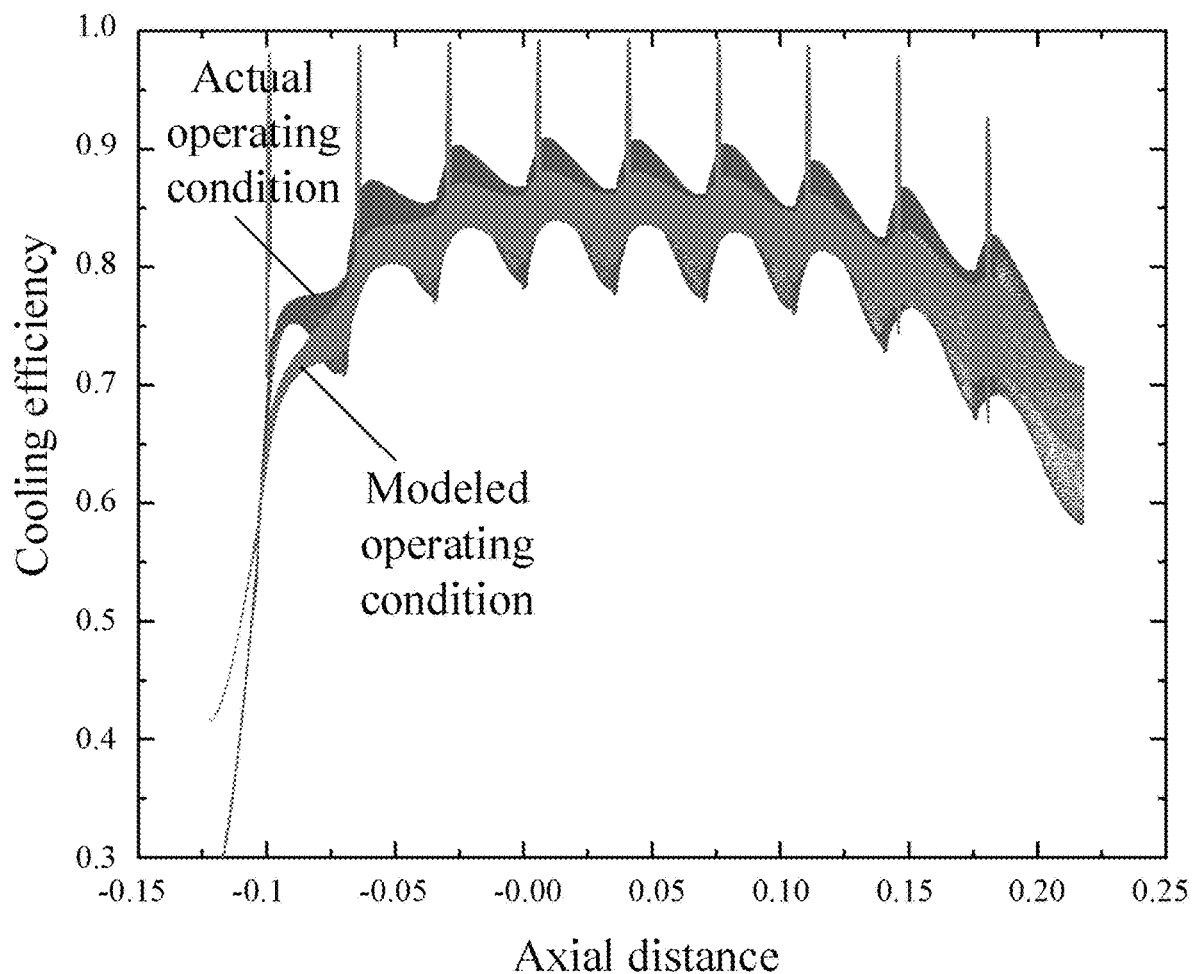
FIG. 6 shows distributions of dimensionless comprehensive cooling efficiency under the actual and modeled conditions.

An axial distance shown in FIG. 6 refers to a lateral distance shown in FIG. 2. Compared with that under the simulated operating condition, the distribution of the dimensionless comprehensive cooling efficiency under the actual operating condition is more concentrated. There is a significant difference in the comprehensive cooling efficiency of the first three rows of guide rings from left to right, due to different temperature ratios and incomplete stacking of the front cooling film. The part imaged by the infrared thermal imager is located close to a position with an axial distance of 0 mm, that is, at the fourth and fifth rows of guide rings. At this point, the fluctuation of the dimensionless comprehensive cooling efficiency under the actual and simulated operating conditions is relatively small, which meets the requirement of evaluating the wall surface cooling effect under the actual operating condition by exploring the dimensionless comprehensive cooling efficiency under the modeled operating condition.

What is claimed is:

1. A method for producing and configuring a model device, said model device being configured to model a wall surface cooling characteristic of a gas turbine combustor,
wherein the model device comprises a hot flow inlet section, a cold flow inlet section, an experimental section, and a gas discharge section; the hot flow inlet section, the cold flow inlet section, and the gas discharge section are sequentially communicated; and the cold flow inlet section and the experimental section are communicated through cooling holes of a cooling structure model;
wherein the model device is configured such that a gas fuel enters the hot flow inlet section and enters the experimental section through the hot flow inlet section, cold air enters the cold flow inlet section and enters the experimental section through the cooling structure model, and a gas in the experimental section enters the gas discharge section and is discharged to an outside of the model device through the gas discharge section; and
wherein a tail end of the experimental section of the model device includes a thermocouple threading seat; the gas discharge section of the model device includes a laser injection window; and the experimental section of the model device includes an infrared thermal imaging measurement window and a visual observation window;
the method comprises:
configuring a flat plate structure to model a wall surface of the gas turbine combustor, wherein the flat plate structure is the cooling structure model of the model device; the flat plate structure is provided with the cooling holes and guide rings; the cooling holes on the flat plate structure of the model device have same aperture sizes, spacing, and holes-area ratio as cooling holes on the wall surface of the gas turbine combustor; and the guide rings of the flat plate structure have same spacing as guide rings on the wall surface of the gas turbine combustor;
determining a pressure, a temperature, and a velocity on a hot flow side of the model device based on a Reynolds number on a hot flow side of the gas turbine combustor, said Reynolds number on a hot flow side of the gas turbine combustor corresponding to an actual operating condition of the gas turbine combustor; and
determining a material and a thickness of the cooling structure model based on a Biot number on the hot flow side of the gas turbine combustor, said Biot number on the hot flow side of the gas turbine combustor corresponding to the actual operating condition of the gas turbine combustor;
wherein the determining the pressure, the temperature, and the velocity on the hot flow side of the model device based on the Reynolds number on the hot flow side of the gas turbine combustor comprises:
calculating the Reynolds number on the hot flow side of the gas turbine combustor;
equating the Reynolds number on the hot flow side of the gas turbine combustor with a Reynolds number on the hot flow side of the model device; and
determining the pressure, the temperature, and the velocity on the hot flow side of the model device based on the Reynolds number on the hot flow side of the model device; and
wherein the determining the material and the thickness of the cooling structure model based on the Biot number on the hot flow side of the gas turbine combustor comprises:
calculating the Biot number on the hot flow side of the gas turbine combustor according to $$Bi = \frac{ht_w}{\lambda},$$

wherein Bi denotes the Biot number on the hot flow side of the gas turbine combustor, h denotes a coupled heat transfer coefficient of convective heat transfer and thermal radiation of the wall surface of the gas turbine combustor; $t_w$ denotes a thickness of the wall surface of the gas turbine combustor, and $\lambda$ denotes a thermal conductivity coefficient of the wall surface of the gas turbine combustor;
equating a Biot number on the hot flow side of the model device with the Biot number on the hot flow side of the gas turbine combustor; and
determining the material and the thickness of the cooling structure model based on the Biot number on the hot flow side of the model device.

2. The modeling method according to claim 1, wherein a hot flow rectification orifice plate is provided between the hot flow inlet section and the experimental section.

3. The modeling method according to claim 1, wherein the cold flow inlet section comprises a cold flow collection chamber and a cold flow chamber; a cold flow rectification orifice plate is provided between the cold flow collection chamber and the cold flow chamber; the cooling structure model is provided between the cold flow collection chamber and the experimental section; and the cold air passes through the cold flow collection chamber and the cold flow chamber in sequence before entering the experimental section.

4. The modeling method according to claim 1, wherein the gas discharge section comprises a gas inlet direction the same as a flow direction of the gas fuel in the experimental section and a gas outlet direction opposite to the gas inlet direction.

5. The modeling method according to claim 1, wherein the experimental section is externally covered with a heat insulation layer.

6. The modeling method according to claim 1, wherein the hot flow inlet section, the cold flow inlet section, and the gas discharge section are integrated.

7. The modeling method according to claim 1, further comprising:
   verifying a modeling result based on a dimensionless comprehensive cooling efficiency.

\* \* \* \* \*